(12) United States Patent
Chang

(10) Patent No.: US 7,296,764 B2
(45) Date of Patent: Nov. 20, 2007

(54) SPINNING REEL

(75) Inventor: Liang-Jen Chang, Taichung (TW)

(73) Assignee: Okuma Fishing Tackle Co., Ltd., Taichung (TW)

( * ) Notice: Subject to any disclaimer, the term of this patent is extended or adjusted under 35 U.S.C. 154(b) by 0 days.

(21) Appl. No.: 11/650,504

(22) Filed: Jan. 8, 2007

(65) Prior Publication Data

US 2007/0108329 A1 May 17, 2007

Related U.S. Application Data

(62) Division of application No. 11/065,067, filed on Feb. 25, 2005, now Pat. No. 7,159,812.

(51) Int. Cl.
*A01K 89/01* (2006.01)
(52) U.S. Cl. .................................................... 242/231
(58) Field of Classification Search ................ 242/230, 242/231, 232, 234
See application file for complete search history.

(56) References Cited

U.S. PATENT DOCUMENTS

| 5,848,757 A | 12/1998 | Amano et al. |
| 6,318,654 B1 | 11/2001 | Amano et al. |
| 6,405,955 B2 | 6/2002 | Furomoto |
| 6,572,042 B2 | 6/2003 | Sugawara |
| 6,595,449 B2 | 7/2003 | Ikuta et al. |
| 2003/0066919 A1 | 4/2003 | Ikuta et al. |

*Primary Examiner*—Gene O. Crawford
*Assistant Examiner*—Evan Langdon
(74) *Attorney, Agent, or Firm*—Browdy and Neimark, PLLC

(57) ABSTRACT

A spinning reel has a reel body and a rotor. The rotor has a base pivoted to the base, a first arm pivoted to an end of the base, a second arm pivoted to the other end of the base, an arc connected between the first arm and the second arm, a guiding block disposed between the first arm and the arc, and a wheel disposed between the guiding block and the first arm. The guiding block has a cone portion connected to the arc and a base portion connected to the wheel. The cone portion has a hole into which the arc is inserted and two tip ends located at opposite sides of the hole.

2 Claims, 5 Drawing Sheets

SPINNING REEL

BACKGROUND OF THE INVENTION

1. Field of the Invention

The present invention relates generally to a fishing tool, and more particularly to a spinning reel, which prevents the fishing line from jam.

2. Description of the Related Art

FIG. 1 and FIG. 2 show a conventional spinning reel 1 mainly having a reel body 2, a spool 3, a rotor 4 and a handle 5. The handle 5 is rotated to drive the spool 3 for reciprocation via a transmission device (not shown) and to drive the rotor 4 for rotation. As a result, a fishing line can be winded on the spool 3.

The rotor 4 has two arms 6 at opposite sides thereof, on one of which a wheel 8 is provided, and a curved arc 7 with opposite ends connected to the arms 6. To wind the fishing line on the wheel 8, there usually is a guiding block 9 between the arc 7 and the wheel 8. The guiding block 9 has a hole 91 behind a tip end thereof to insert the arc 7 therein. To avoid the fishing line jamming in a gap between the arc 7 and the guiding block 9, the hole 91 is kept away from a backside of the tip end of the guiding block 9, such that a location labeled a (between the arc 7 and the tip end of the guiding block 9) in the FIG. 1 indicating that the fishing line is jammed thereat is kept out of a path of the fishing line passing to reduce the risk of jamming of the fishing line.

When the fishing line is released, the arc 7 and the arms 6 have to be rotated about 110 degrees, as shown in FIG. 2. At this time, the fishing line is twisted randomly, and sometime the fishing line is jammed as shown in FIG. 3, in which the fishing line 92 is jammed between the arc 7 and the tip end of the guiding block 9 (the location a).

SUMMARY OF THE INVENTION

The primary objective of the present invention is to provide a spinning reel, which avoids the jamming of a fishing line.

According to the objectives of the present invention, a spinning reel comprises a reel body and a rotor. The rotor has a base pivoted to the reel body, a first arm pivoted to an end of the base, a second arm pivoted to the other end of the base, an arc connected between the first arm and the second arm, a guiding block disposed between the first arm and the arc, and a wheel disposed between the guiding block and the first arm. The guiding block has a cone portion connected to the arc and a base portion connected to the wheel. The cone portion has a hole into which the arc is inserted and two tip ends located at opposite sides of the hole.

DETAILED DESCRIPTION OF THE INVENTION

Figure 4:
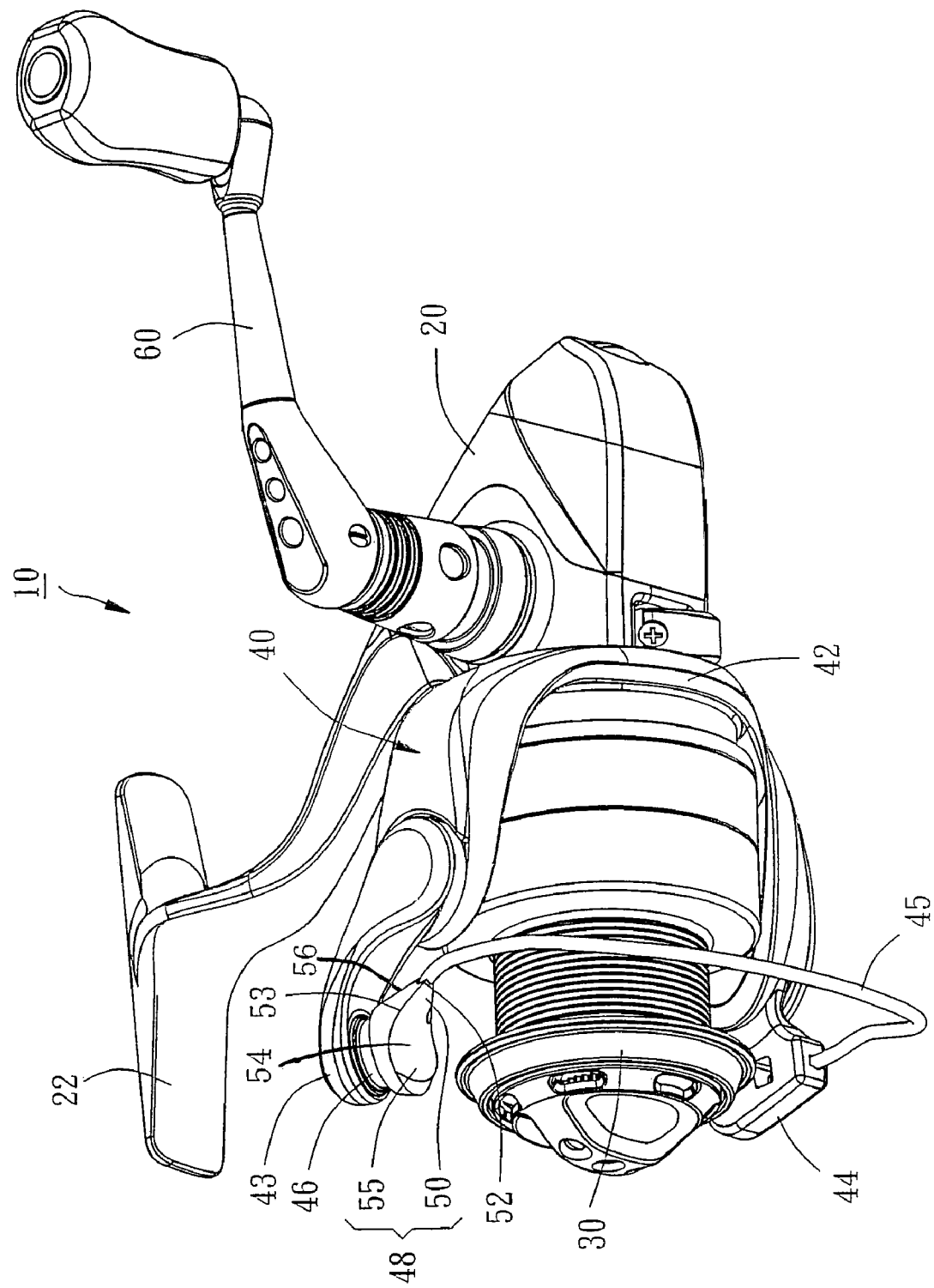
FIG. 4 is a perspective view of a preferred embodiment of the present invention.

As shown in FIG. 4, a spinning reel 10 of the preferred embodiment of the present invention comprises a reel body 20, a spool 30, a rotor 40, a handle 60 and a transmission device (not shown).

The reel body 20 has a T-shaped connection portion 22 to be connected to a fishing rod (not shown). The spool 30 is provided at a front end of the reel body 20 to wind a fishing line (not shown) thereon. The handle 60 is provided at a side of the reel body 20 to drive the spool 30 for reciprocation via the transmission device.

The rotor 40 has a base pivoted to the reel body 20, a first arm 43 pivoted to an end of the base 42, a second arm 44 pivoted to the other end of the base 42, a curved arc 45 connected between the arms 43 and 44, a guiding block 48 disposed between the first arm 43 and the arc 45 and a wheel 46 disposed between the guiding block 48 and the first arm 43. The guiding block 48, and a base portion 55 connected to the wheel 46 has a cone portion 50 connected to the arc 45. The cone portion 50 has a hole into which the arc 45 is inserted which creates two tip ends 52 located at opposite sides of the hole on the upper surface 54 of the guiding block 48. As shown in FIG. 4, the hole provided at the end of cone portion 50 to engage arc 45 creates an arc edge 60 on the upper surface 54 extending into the upper surface 54 and an arc edge 62 extending down from the side edges 53 of upper surface 50 into the bottom surface 54. Arc edges 60 and 62 together forming the sides of the two tip ends 52 and side edges 53 extending down from the tip ends 52 between arc edges 60 and 62 into base portion 55.

Figure 5:
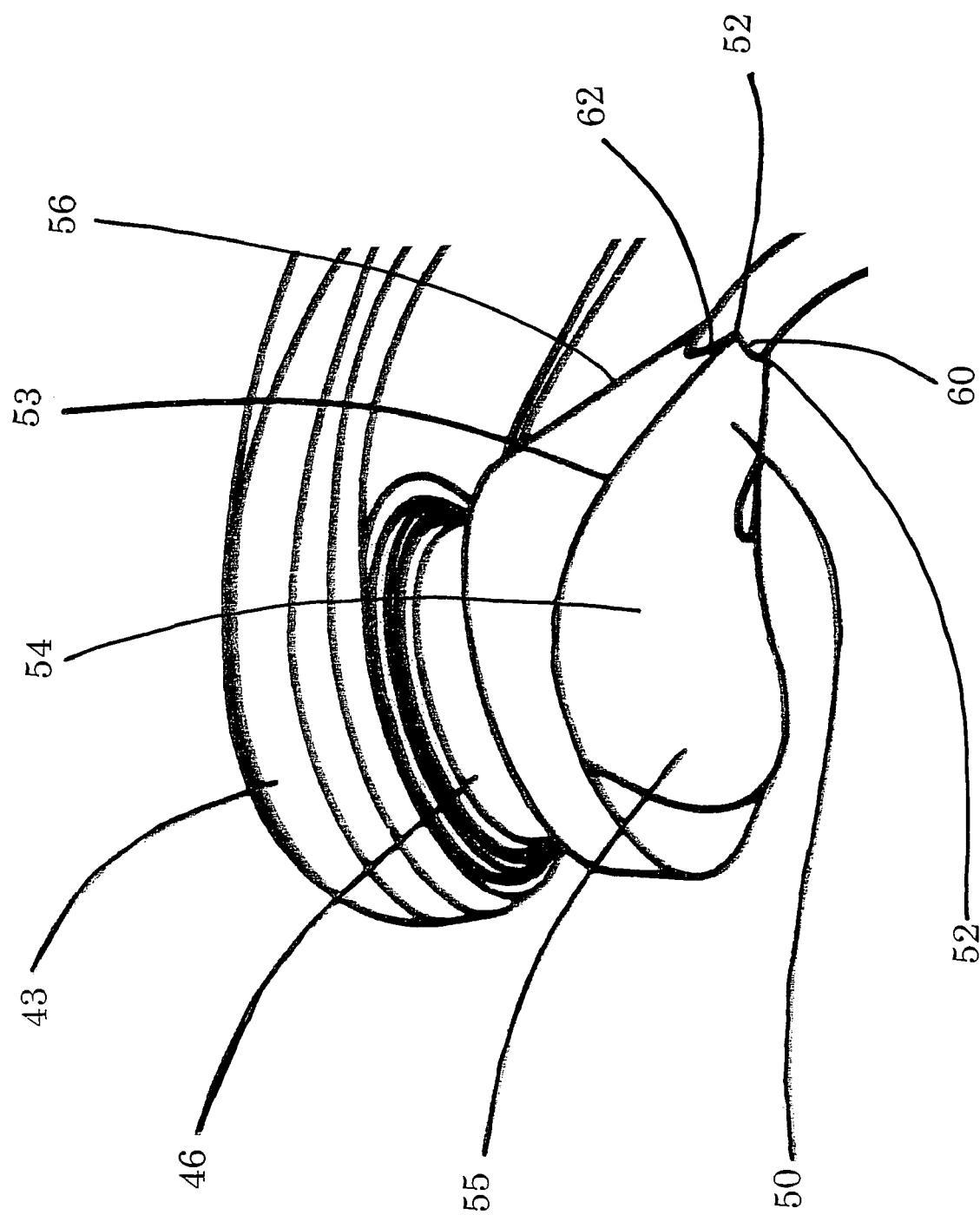
FIG. 5 is an exploded view of the guiding block of the preferred embodiment of the present invention.

In practice, as shown in FIG. 5, the guiding block 48 is made into a cone-shaped block, and then the guiding block 48 is drilled with a hole at a tip end of the cone portion 50. Because the guiding block 48 has two side edges 53 at opposite sides of upper surface 54, the two tip ends 52 are formed on the cone portion 50 of the guiding block 48.

Figure 1:
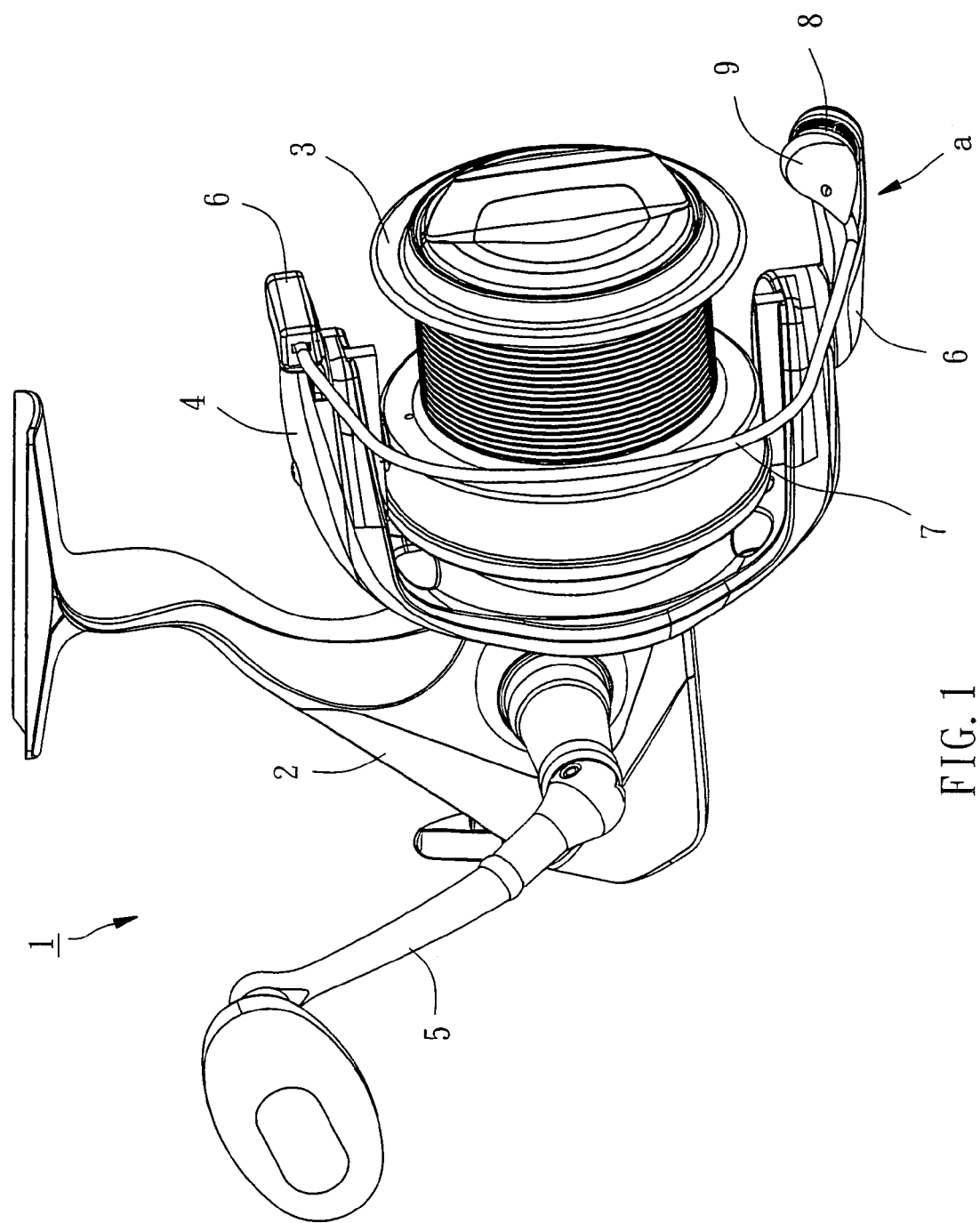
FIG. 1 is a perspective view of the conventional spinning reel.
Figure 2:
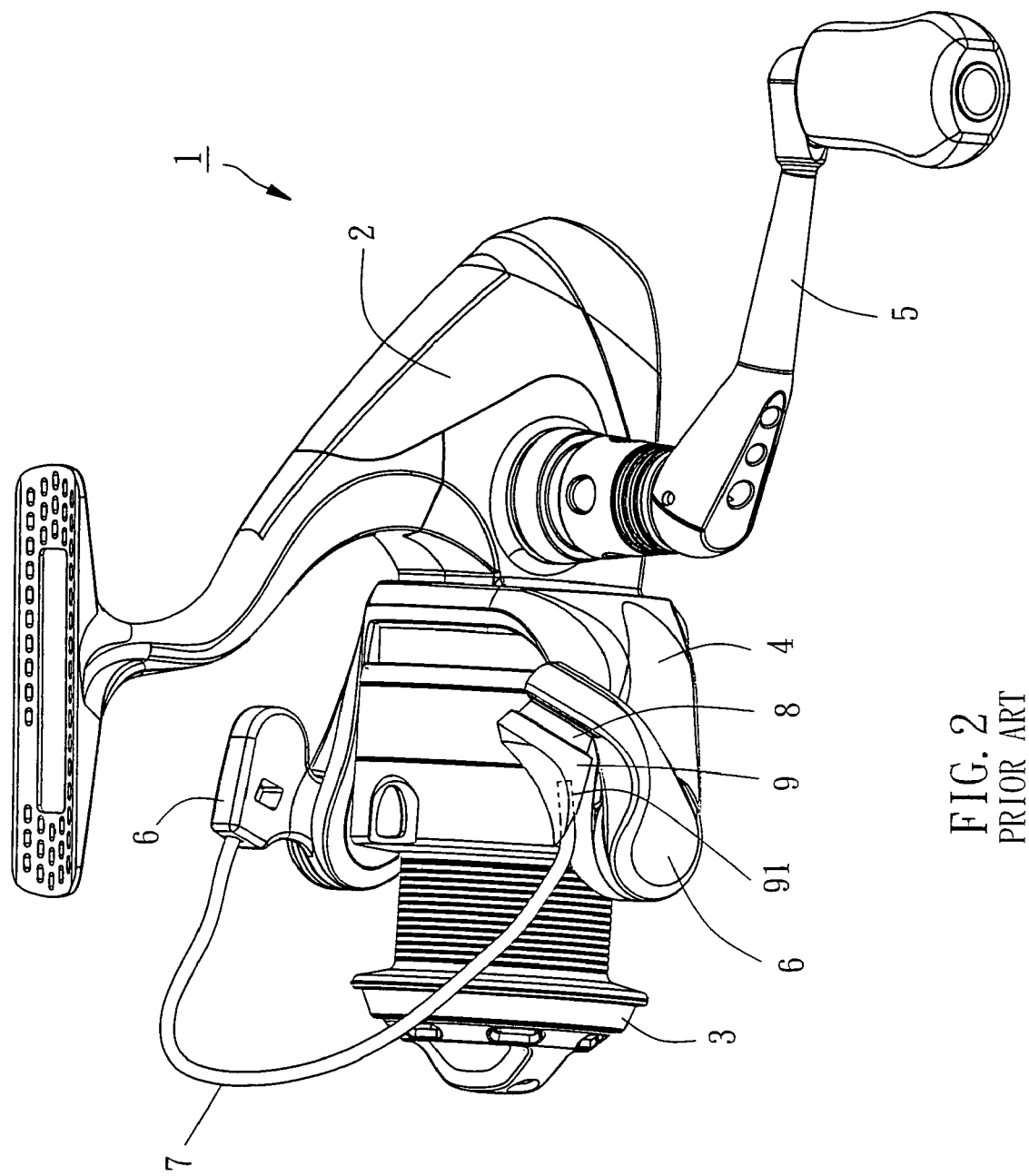
FIG. 2 is a perspective view of the conventional spinning reel in action.
Figure 3:
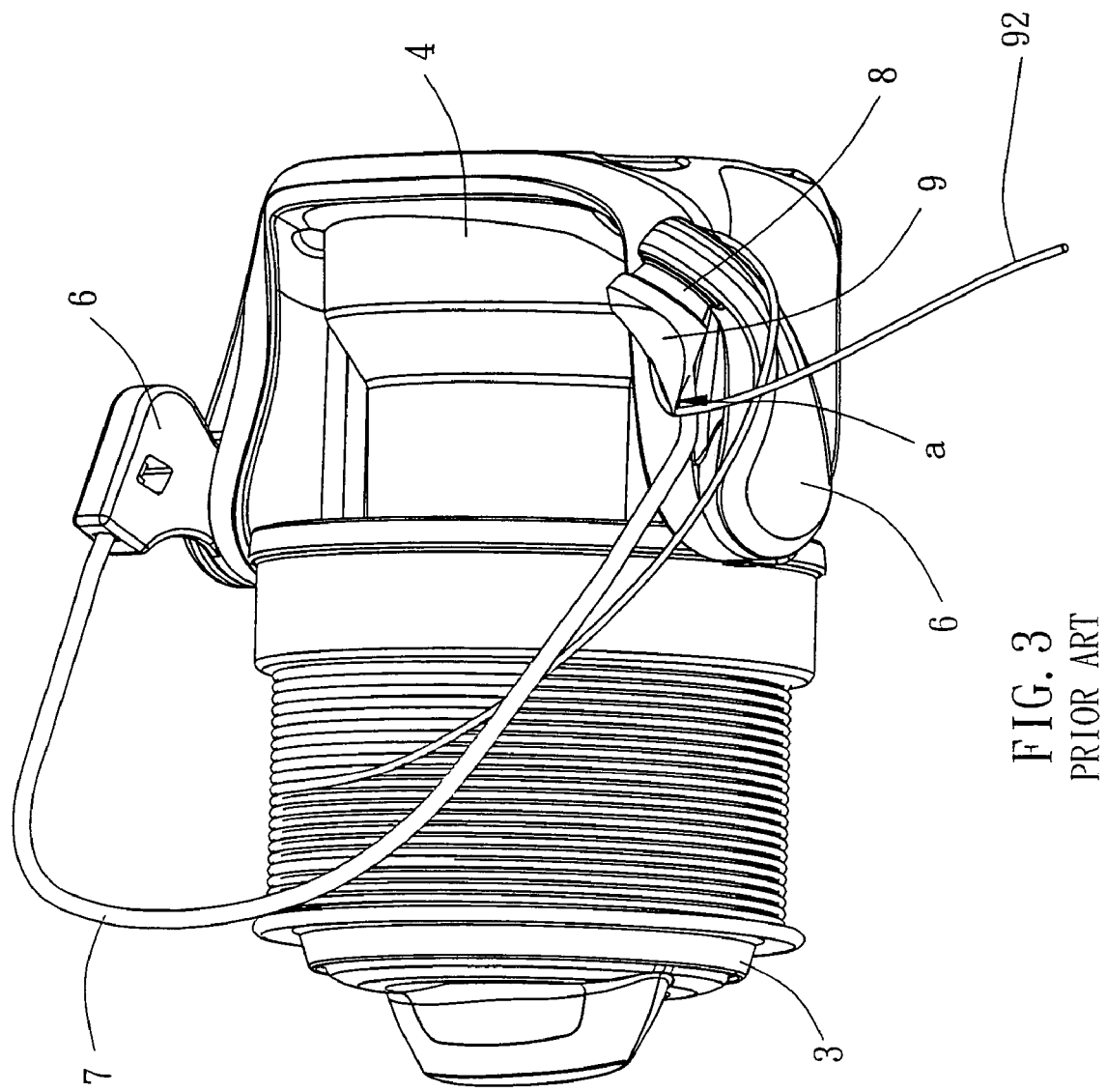
FIG. 3 is an enlarged view in parts of the conventional spinning reel.

When the spinning reel 10 of the present invention is in a normal operation, the fishing line is located at a right side of the wheel 46 (according to FIG. 4) via the guiding block 48 so that the fishing line will not jam between the tip ends 52 of the guiding block 48 and the arc 45. When the spinning reel 10 of the present invention releases the fishing line so that the arc 45 and the arms 43 and 44 are rotated to the position shown as FIG. 2, the fishing line passes the guiding block 48 randomly via a left side thereof (according to FIG. 4) to avoid the fishing line from being jammed between the tip ends 52 of the guiding block 48 and the arc 45.

In conclusion, the spinning reel 10 of the present invention provides two tip ends 52 of the guiding block 48 to replace the single tip end of the conventional guiding block at the left side of the arc (according to FIG. 4) and keeps the tip ends 52 away from the right side of the arc 45 (according to FIG. 4) at the same time. The relative positions of the tip ends are not restricted in the drawings shown in the present invention. Any equivalent structure should be still within the scope of the present invention.

What is claimed is:

1. A spinning reel, comprising:
   a reel body, and
   a rotor having a base pivoted to the reel body, a first arm pivoted to an end of the base, a second arm pivoted to the other end of the base, an arc connected between the first arm and the second arm, a guiding block having an upper surface and a bottom surface disposed between the first arm and the arc, and a wheel disposed between the guiding block and the first arm;

wherein the guiding block has a cone portion connected to the arc and a base portion connected to the wheel;

wherein the cone portion of the guiding block is provided with a hole within which the arc is engaged, wherein the hole forms a first arc edge extending into the upper surface of the guiding block and a second arc edge extending down from the upper surface into the bottom surface of the guiding block; and wherein two intersections of first arc edge and the second arc edge respectively produce two tip ends located at opposite sides of the hole at the upper surface of the guiding block.

2. The spinning reel as defined in claim 1, wherein the upper surface of the guiding block has side edges which respectively extend from the two tip ends toward the base portion.

* * * * *